(12) United States Patent
Si (10) Patent No.: US 8,491,431 B2
(45) Date of Patent: Jul. 23, 2013

(54) RECONFIGURABLE HYBRID GEAR TRAIN

(75) Inventor: Baojun Si, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 319 days.

(21) Appl. No.: 12/956,280

(22) Filed: Nov. 30, 2010

(65) Prior Publication Data

US 2011/0070992 A1    Mar. 24, 2011

Related U.S. Application Data

(63) Continuation-in-part of application No. 12/318,008, filed on Dec. 19, 2008, now Pat. No. 7,998,016.

(51) Int. Cl.
*F16H 3/72* (2006.01)
*F16H 3/44* (2006.01)

(52) U.S. Cl.
USPC ............................................. 475/5; 475/284

(58) Field of Classification Search
USPC .................................................... 475/5, 284
See application file for complete search history.

(56) References Cited

U.S. PATENT DOCUMENTS

| | | | |
|---|---|---|---|
| 5,603,671 A | 2/1997 | Schmidt | |
| 5,853,345 A | 12/1998 | Park | |
| 6,551,208 B1 | 4/2003 | Holmes et al. | |
| 6,592,484 B1 | 7/2003 | Tsai et al. | |
| 6,837,816 B2 | 1/2005 | Tsai et al. | |
| 6,852,053 B2 | 2/2005 | Nakano et al. | |
| 7,070,530 B2 | 7/2006 | Ai et al. | |
| 7,117,965 B2 | 10/2006 | Yatabe et al. | |
| 7,128,675 B2 | 10/2006 | Klemen et al. | |
| 7,169,074 B2 | 1/2007 | Raghavan et al. | |
| 7,192,378 B2 | 3/2007 | Raghavan et al. | |
| 7,195,573 B2 | 3/2007 | Bezian et al. | |
| 7,214,154 B2 | 5/2007 | Klemen et al. | |
| 7,220,202 B2 | 5/2007 | Singh et al. | |
| 7,291,080 B2 | 11/2007 | Minagawa et al. | |
| 7,389,168 B2 | 6/2008 | Imazu et al. | |
| 7,395,837 B2 | 7/2008 | Foster et al. | |
| 2006/0052199 A1 | 3/2006 | Singh et al. | |
| 2007/0287564 A1 | 12/2007 | Cho et al. | |

(Continued)

FOREIGN PATENT DOCUMENTS

JP    2008-075720    4/2008

OTHER PUBLICATIONS

Reply to Office Action, Mar. 22, 2011, 16 pages, U.S. Appl. No. 12/318,008.

(Continued)

*Primary Examiner* — Edwin A Young
(74) *Attorney, Agent, or Firm* — Finnegan, Henderson, Farabow, Garrett & Dunner LLP (57) ABSTRACT

A gear train may include a first planetary gear set, which may include a first sun gear, a first ring gear, and a first carrier. The gear train may also include a second planetary gear set, which may include a second sun gear, a second ring gear, and a second carrier. Additionally, the gear train may include a first clutch configured to selectively connect the first carrier with the second carrier, as well as a second clutch configured to selectively connect the first sun gear with the second sun gear. The gear train may also include a first brake configured to selectively fix the second sun gear, as well as a second brake configured to selectively fix the first carrier.

19 Claims, 6 Drawing Sheets

U.S. PATENT DOCUMENTS

| | | |
|---|---|---|
| 2007/0287565 A1 | 12/2007 | Cho et al. |
| 2008/0125264 A1* | 5/2008 | Conlon et al. ............... 475/5 |
| 2008/0125265 A1 | 5/2008 | Conlon et al. |
| 2008/0207373 A1 | 8/2008 | Conlon |
| 2010/0160108 A1 | 6/2010 | Si et al. |

OTHER PUBLICATIONS

Non-Final Office Action, Dec. 22, 2010, 6 pages, U.S. Appl. No. 12/318,008.

* cited by examiner

RECONFIGURABLE HYBRID GEAR TRAIN

RELATED APPLICATIONS

This is a continuation-in-part of application Ser. No. 12/318,008, filed Dec. 19, 2008, now U.S. Pat. No. 7,998,016 which is incorporated herein by reference.

TECHNICAL FIELD

The present disclosure relates to gear trains and, more particularly, to gear trains including multiple planetary gear sets.

BACKGROUND

Many machines, such as mobile machines include a power system with a fuel-powered engine providing mechanical power to a transmission. The transmission typically includes a plurality of selectable gear ratios that transfer the mechanical power from the engine to one or more loads. For example, the transmission may be configured to deliver mechanical power to one or more traction devices so as to propel the machine. Hybrid power systems may include one or more motor/generators operatively connected to the transmission. In such systems, the motor/generators may be selectively operated to provide extra mechanical power to the transmission, i.e., in addition to the engine, or to receive extra mechanical power from the transmission, i.e., from the engine and final drive. The received mechanical power may be converted into electrical power and stored for later use. Additionally, a hybrid power system may be configured to selectively operate in a motor/generator only mode, i.e., the transmission may only receive mechanical power from the motor/generators.

U.S. Pat. No. 7,220,202 ("the '202 patent") issued to Singh et al. discloses an electrically variable transmission. The transmission includes first and second planetary gear sets. An input member is continuously connected to the ring gear of the first planetary gear set and an output member is continuously connected to the carrier of the second planetary gear set. The transmission also includes a first motor/generator continuously connected to the sun gear of the first planetary gear set and a second motor/generator continuously connected to the sun gear of the second planetary gear set. The transmission also includes five torque transfer devices. Three torque transfer devices selectively interconnect components of the first and second planetary gear sets to one another, i.e., act as clutches. Two torque transfer devices selectively fix components of the first and second planetary gear sets to a housing, i.e., act as brakes.

The transmission of the '202 patent may be operable in different operating modes depending upon the combination of torque transfer devices that are engaged. However, because of the particular arrangement of the various components of the transmission, e.g., the motor/generators and the torque transfer devices, the transmission of the '202 patent may have a limited set of operating modes. As such, the transmission of the '202 patent may be limited in its applicability.

The present disclosure is directed to overcoming one or more of the shortcomings set forth above and/or other shortcomings in the previous arts.

SUMMARY

In one aspect, the present disclosure is directed to a gear train. The gear train may include a first planetary gear set, which may include a first sun gear, a first ring gear, and a first carrier. The gear train may also include a second planetary gear set, which may include a second sun gear, a second ring gear, and a second carrier. Additionally, the gear train may include a first clutch configured to selectively connect the first carrier with the second carrier, as well as a second clutch configured to selectively connect the first sun gear with the second sun gear. The gear train may also include a first brake configured to selectively fix the second sun gear, as well as a second brake configured to selectively fix the first carrier.

In another aspect, the present disclosure is directed to a method of operating a power system. The method may include transmitting power between a power source, a first motor/generator, and a power load via a gear train. The gear train may include a first planetary gear set and a second planetary gear set. The first planetary gear set may include a first sun gear, a first ring gear, and a first carrier. The second planetary gear set may include a second sun gear, a second ring gear, and a second carrier. The method may also include controlling transmission of power within the gear train by controlling a first clutch, a second clutch, a first brake, and a second brake. This may include selectively engaging the first clutch to connect the first carrier with the second carrier, as well as selectively engaging the second clutch to connect the first sun gear with the second sun gear. The method may also include selectively engaging the first brake to fix the second sun gear, as well as selectively engaging the second brake to fix the first carrier.

In another aspect, the present disclosure is directed to a gear train. The gear train may include a first planetary gear set and a second planetary gear set, each including a sun gear, a carrier, and a ring gear. The gear train may also include a plurality of clutches, each configured to selectively connect and disconnect a component of the first planetary gear set to or from a component of the second planetary gear set. Additionally, the gear train may include a plurality of brakes, each configured to selectively fix at least one component of one of the first and second planetary gear sets. In the gear train, by selectively engaging one or more of the plurality of clutches and plurality of brakes, a plurality of operating modes may be enabled. The plurality of operating modes may include a first mode, wherein the first and second planetary gear sets are mechanically disconnected from one another and power is transmitted between the first and second planetary gear sets via an electrical connection between the first and second planetary gear sets. The plurality of operating modes may also include a second mode, wherein power is transmitted only mechanically between the first and second planetary gear sets through one or more of the plurality of clutches. Additionally, the plurality of operating modes may include a third mode, wherein power is transmitted mechanically between the first and second planetary gear sets through one or more of the plurality of clutches, and wherein and power is also transmitted between the first and second planetary gear sets via the electrical connection between motor/generators and mechanical linkage of planetary gears.

DETAILED DESCRIPTION

Figure 1:
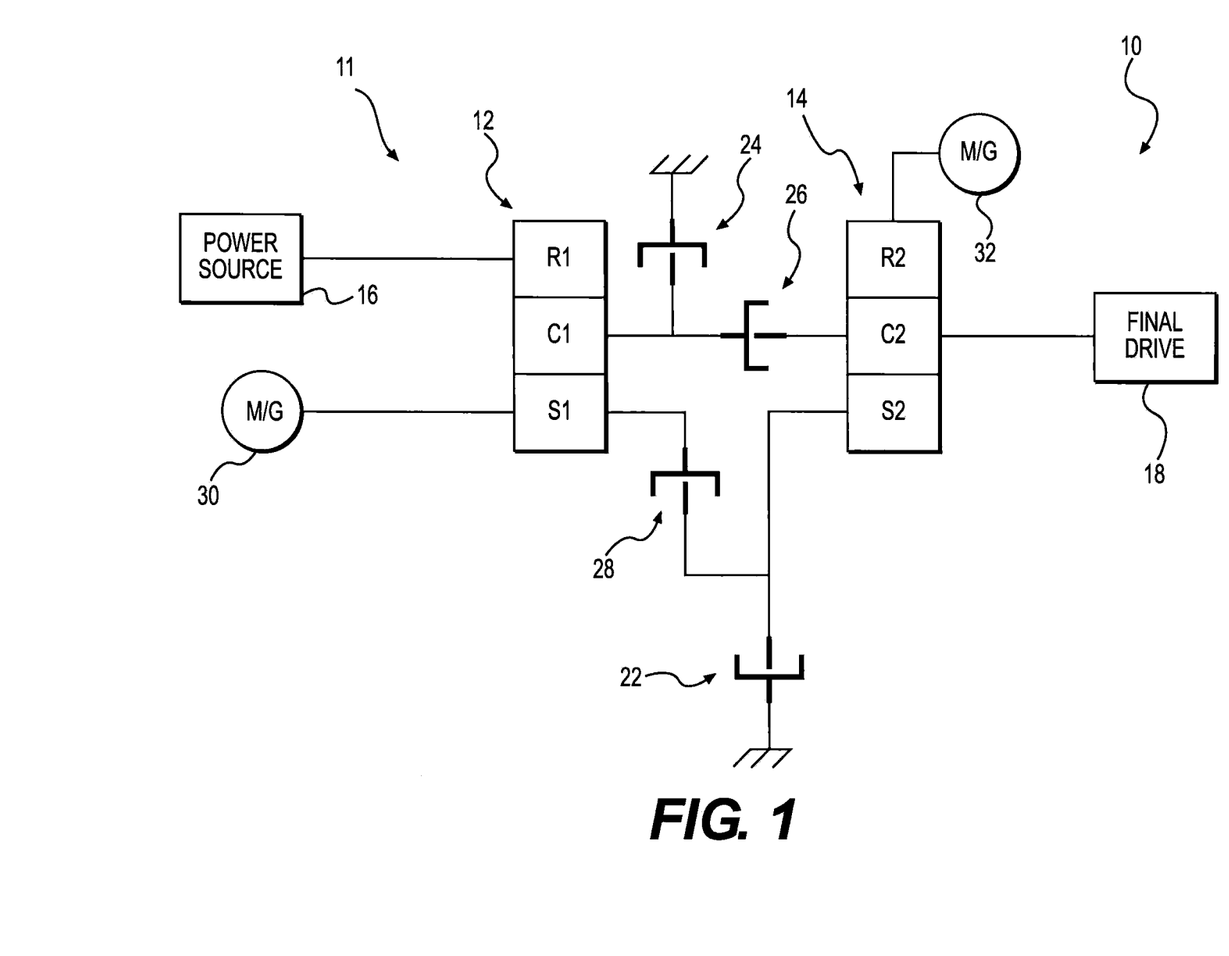
FIG. 1 is a schematic illustration of an exemplary gear train in accordance with the present disclosure.

FIG. 1 schematically illustrates an exemplary power system 11 and gear train 10. In addition to gear train 10, power system 11 may include a power source 16, a motor/generator 30, and a motor/generator 32. Additionally, power system 11 may include a power load, such as a final drive 18. Power system 11 may serve various purposes in various types of machines. In some embodiments, power system 11 may serve as a propulsion system of a mobile machine and implementation unit of construction machines.

Gear train 10 may include a planetary gear set 12 and a planetary gear set 14 configured to receive input power from power source 16 and operatively deliver output power to final drive 18. Gear train 10 may be housed within a transmission housing (not shown) and may include a brake 22 and a brake 24, each configured to selectively fix one or more components of planetary gear sets 12, 14 with respect to the housing, i.e., a non-rotatable structure. Gear train 10 may also include a clutch 26 and a clutch 28 configured to selectively interconnect one or more components of planetary gear set 12 with planetary gear set 14. Gear train 10 may also have planetary gear sets 12, 14 interconnected with motor/generators 30, 32.

Power system 11 may also includes hardware controller and software control logic (not shown) configured to control the operation of brakes 22, 24, clutches 26, 28, and motor/generators 30, 32. Final drive 18 may be operatively connected to a drivable load (not shown) such that gear train 10 is configured to supply a torque and angular speed. It is contemplated that planetary gear sets 12, 14, brakes 22, 24, and clutches 26, 28 may be housed within a transmission housing. It is also contemplated that motor/generators 30, 32 may also be housed within the transmission housing. It is further contemplated that gear train 10 may be physically oriented within the transmission housing in any arrangement.

Planetary gear sets 12, 14, may each include a sun gear, a plurality of planet gears each rotatably mounted to a carrier. As is known in the art, the planet gears may be disposed radially between and intermeshed with both the sun gear and the ring gear. The sun gear may be disposed radially inside the planet gears and the ring gear is disposed radially outside the planet gears. Specifically, planetary gear set 12 may include a sun gear S1, a carrier C1, and a ring gear R1. Planetary gear set 14 may include a sun gear S2, a carrier C2, and a ring gear R2.

Power source 16 may include any source of power such as, for example, a gasoline or diesel combustion engine, a fuel-cell-powered mover, a natural gas engine, and/or any other power producing device known in the art. Power source 16 may include one or more components, e.g., a crankshaft that mechanically coupled to gear train 10. For example, a crankshaft of power source 16 may be continuously connected to ring gear R1 of planetary gear set 12.

Final drive 18 may be operatively connected to one or more loads, e.g., traction devices (such as wheels or track units, and mechanical movable linkage), and may be configured to transfer mechanical power from gear train 10 thereto. Final drive 18 may be continuously connected to carrier C2 of planetary gear set 14. Final drive 18 may include one or more additional gear sets or gear trains configured to further modify the mechanical output, i.e., the torque and/or angular velocity, of carrier C2, and thus, the transfer of output power of gear train 10 is conducted.

Brakes 22, 24, may each be configured to selectively operate in a first, disengaged mode permitting rotational motion and a second, engaged mode substantially prohibiting rotational motion. Brake 22 may be interconnected between the housing of gear train 10 and sun gear S2 of planetary gear set 14. When engaged, brake 22 may be configured to selectively prohibit sun gear S2 from rotating. Brake 24 may be interconnected between the housing of gear train 10 and carrier C1 of planetary gear set 12. When engaged, brake 24 may be configured to selectively prohibit carrier C1 from rotating. Each of brakes 22, 24 may include any conventional brake apparatus.

Clutches 26, 28 may each be configured to selectively operate in a first, disengaged mode permitting relative rotation between two components and a second, engaged mode substantially prohibiting relative rotation between two components. Clutch 26 may be interconnected between carrier C1 of planetary gear set 12 and carrier C2 of planetary gear set 14. When engaged, clutch 26 may be configured to selectively connect carriers C1 and C2 together such that they have substantially the same rotational speed. Clutch 28 may be interconnected between sun gear S1 and sun gear S2. When engaged, clutch 28 may be configured to selectively connect sun gears S1 and S2 together such that they have substantially the same rotational speed. Each of clutches 26, 28 may include any conventional clutch apparatus.

As explained above, brake 22 may be connected to sun gear S2. As such, when brake 22 and clutch 28 are both engaged, sun gears S1 and S2 may both be substantially prohibited from rotating. This results from the fact that engaging clutch 28 dictates that sun gear S1 have the same rotational speed as sun gear S2, which is fixed against rotation when brake 22 is engaged. Similarly, brake 24 may be connected to carrier C1. As such, when brake 24 and clutch 26 are both engaged, carriers C1 and C2 may both be substantially prohibited from rotating.

Motor/generators 30, 32 may each be configured to operate in a first, driving mode configured to deliver mechanical power and a second, driven mode configured to receive mechanical power. Motor/generator 30 may be operatively connected to sun gear S1 and may be configured to selectively receive and deliver mechanical power to sun gear S1 depending upon the operational mode of motor/generator 30. Motor/generator 32 may be operatively connected to ring gear R2 of planetary gear set 14. Motor/generator 32 may be configured to selectively receive and deliver mechanical power to ring gear R2. Motor/generators 30, 32 may each be an electrical motor/generator including stator(s), rotor(s), and/or additional components configured to selectively operate as a motor, i.e., convert electrical power to mechanical power, and as a generator, i.e., convert mechanical power to electrical power. Alternatively, each of motor/generators 30, 32 may be a hydraulic or pneumatic pump/motor including one or more chambers and/or additional components configured to selectively operate as a motor, i.e., convert hydraulic or pneumatic power to mechanical power, and as a generator, i.e., convert mechanical power to hydraulic or pneumatic power. Additionally, motor/generators 30,32 may be configured to selectively operate in forward and reverse directions when operating as either a motor or a generator. Thus, each motor/generator 30, 32 may be any type of component that is either 1) configured to operate as a motor using electricity or some other source of energy, 2) configured to receive mechanical power and produce electrical power or pump a fluid or air, or 3) configured such that it can selectively operate as a motor or as a generator. In the interest of clarity the description of gear train 10 below is made with reference to motor/generators 30, 32 being configured as electrical motor/generators. However, the general principles of operation discussed below apply equally to embodiments of power system 11 where motor/generators 30, 32 have other configurations.

Gear train 10 may be operable in a plurality of different power-system operating modes by selectively engaging one or more of brakes 22, 24, selectively engaging one or more of clutches 26, 28, and controlling the operation of motor/generators 30, 32. Table 1 shows a plurality of power-system operating modes of gear train 10. Table 1 designates, for each power-system operating mode, which of brakes 22, 24 and which of clutches 26, 28 are engaged. In addition, Table 1 shows the operating mode of motor/generators 30, 32 for each power-system operating mode.

TABLE 1

| | Brake 22 Engaged | Brake 24 Engaged | Clutch 26 Engaged | Clutch 28 Engaged | M/G 30 Status | M/G 32 Status |
|---|---|---|---|---|---|---|
| Series | yes | yes | | | gen. | mtr. |
| Parallel | yes | | yes | yes | off | mtr. |
| Input CVT | yes | | yes | | gen. | mtr. |
| Compound CVT | | | yes | yes | gen./mtr. | gen./mtr. |
| Parking (engine off) | yes | yes | yes | yes | off | off |
| Parking (engine on) | yes | yes | yes | | gen | off |
| Neutral (idle) | | | | | off | off |
| Starting (park) | yes | yes | yes | | mtr. | off |
| Starting (neutral) | | yes | | | mtr. | off |
| Reverse | yes | | | | | mtr. (rev) |
| Reverse (Series) | yes | yes | | | gen. | mtr. |
| Electric Drive 1 | yes | | | | off | mtr. |
| Electric Drive 2 | yes | | | yes | mtr. | mtr. |

Figure 2:
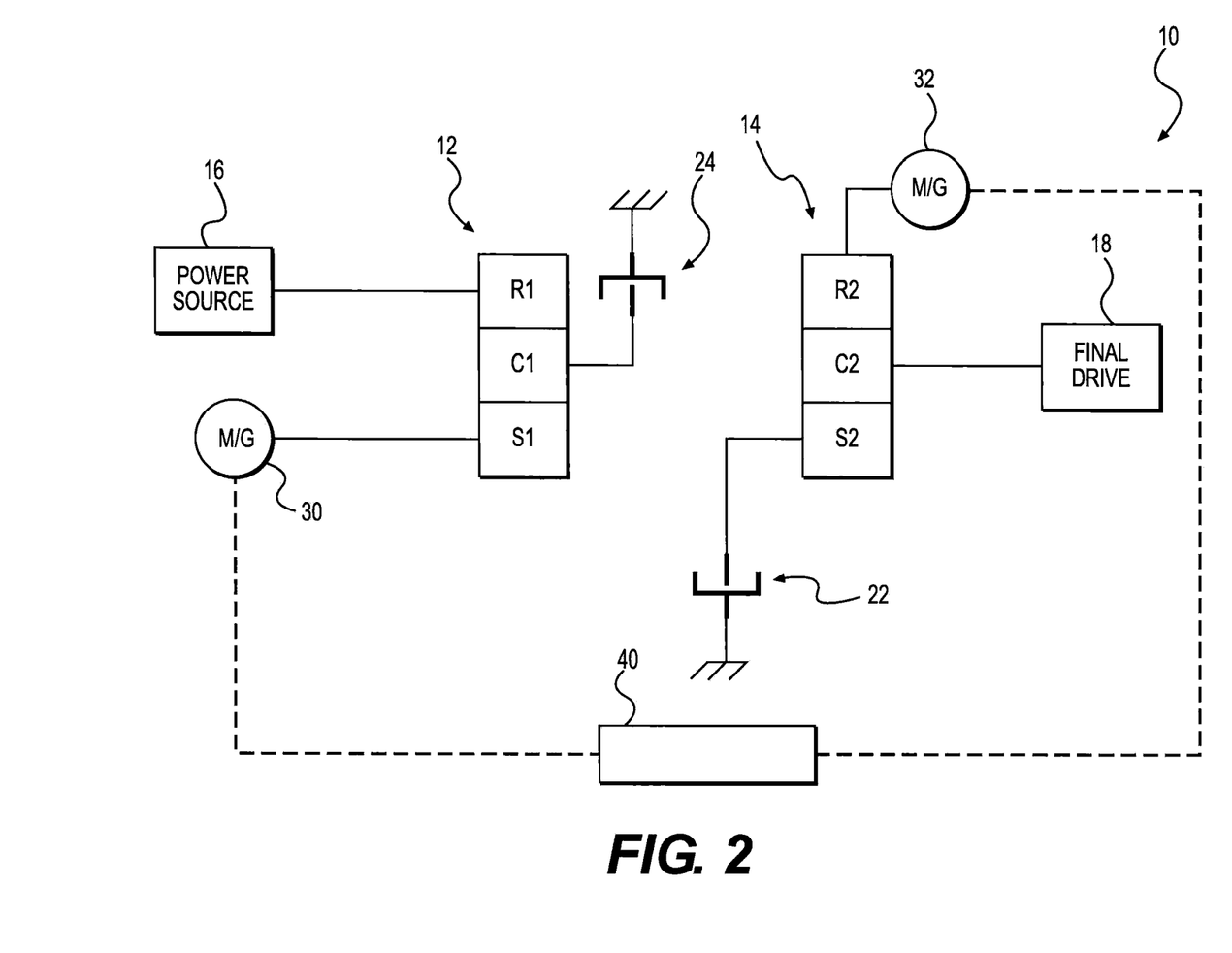
FIG. 2 is a schematic illustration of the gear train of FIG. 1 in an exemplary first operating mode.

FIG. 2 illustrates a first exemplary operating mode of power system 11 and gear train 10, in which brakes 22, 24 are engaged. This operating mode may be considered a "series" operating mode wherein planetary gear set 12 may be mechanically disconnected from planetary gear set 14 and may, instead, be electrically connected thereto in series. In this operating mode, clutches 26, 28 may be disengaged and, for clarification purposes, are not illustrated. Gear train 10 may receive input power from power source 16 via ring gear R1 causing ring gear R1 to rotate. Brake 24 may be engaged and may substantially prohibit carrier C1 from rotating. As is known in the art, the individual planet gears rotatably connected to carrier C1 may freely rotate about their individual axes with respect to carrier C1, even though carrier C1 itself may be fixed. As such, the planet gears may cause sun gear S1 to rotate. Motor/generator 30 may receive mechanical power from sun gear S1 and convert it into electrical power. Motor/generator 30 may be electrically connected to motor/generator 32 via an electrical circuit 40, that may include a controller and/or one or more other electrical devices, e.g., a battery or switches.

In the "series" operating mode, motor/generator 32 may receive electrical power from motor/generator 30, via circuit 40, convert the electrical power into mechanical power, and input mechanical power to ring gear R2, causing ring gear R2 to rotate. Brake 22 may be engaged and may substantially prohibit sun gear S2 from rotating. As is known in the art the individual planet gears rotatably connected to carrier C2 may freely rotate about their individual axes with respect to carrier C2. Carrier C2 may not be fixed, sun gear S2 may be fixed, and the planet gears may revolve about sun gear S2, causing carrier C2 to rotate about sun gear S2.

Carrier C2 may output mechanical power from gear train 10 to final drive 18. By adjusting the amount of electrical power transferred from motor/generator 30 to motor/generator 32, the input-output ratio from power source 16 to final drive 18, i.e., the gear ratio of gear train 10, may be continuously varied. It is also contemplated that power source 16 may be operated at a substantially constant operating condition while the input-output ratio from power source 16 to final drive 18 may be varied via motor/generator 32. In addition or alternatively, power source 16 may be operated at varying operating conditions to vary the input-output ratio from power source 16 to final drive 18 while motor/generator 32 may be operated at substantially constant operating conditions.

Figure 3:
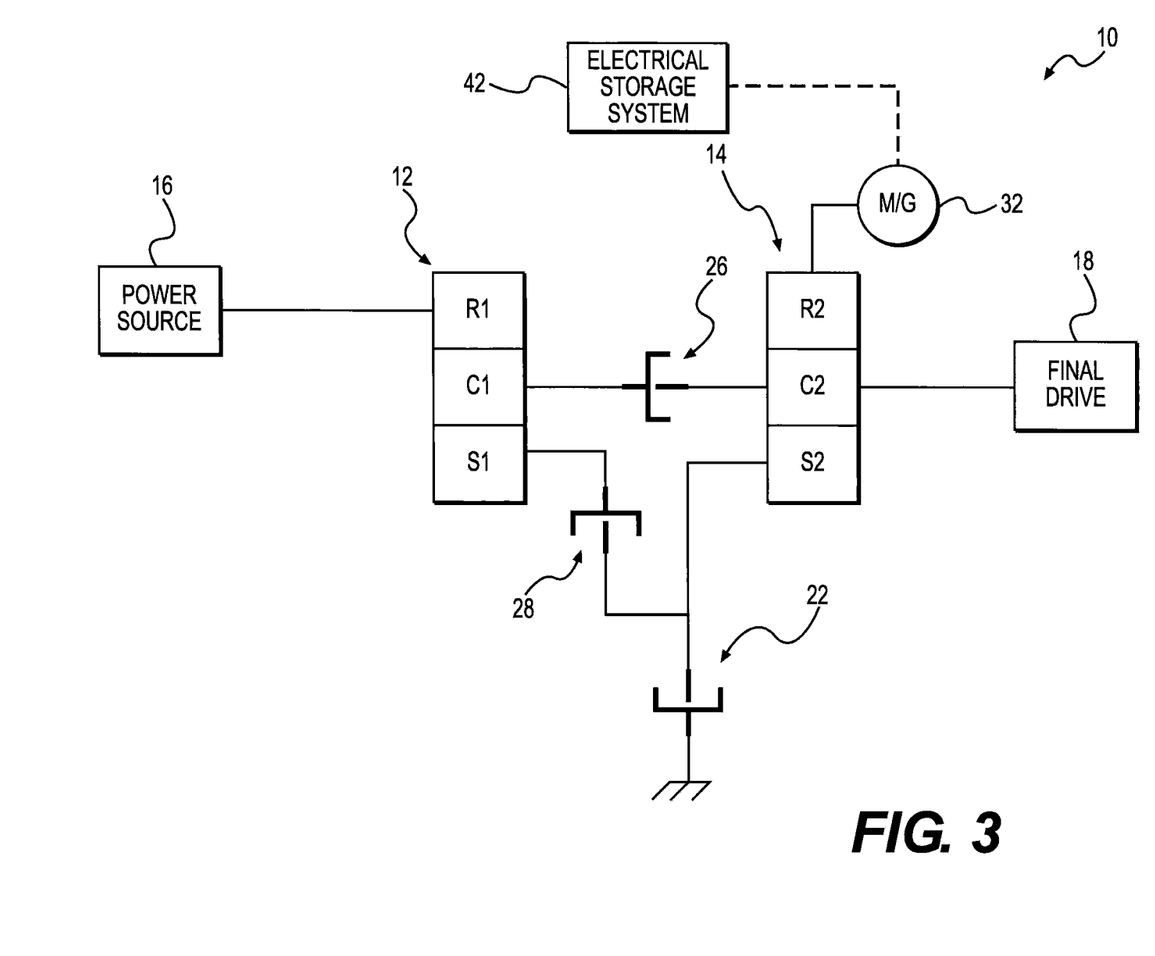
FIG. 3 is a schematic illustration of the gear train of FIG. 1 in an exemplary second operating mode.

FIG. 3 illustrates a second exemplary operating mode of power system 11 and gear train 10, in which brake 22 and clutches 26, 28 are engaged. The second operating mode may be considered a "parallel" mode wherein planetary gear sets 12, 14 may each receive mechanical input power that may be combined and output to final drive 18. Brake 24 may be disengaged and, for clarification purposes, are not illustrated. In "parallel" mode, gear train 10 may receive input power from power source 16 via ring gear R1 causing ring gear R1 to rotate. With brake 22 and clutch 28 engaged, brake 22 may hold sun gear S2 fixed, and, by connecting sun gear S1 to sun gear S2, clutch 28 may prohibit sun gear S1 from rotating. As is known in the art, the individual planet gears rotatably connected to carrier C1 may freely rotate about their individual axes with respect to carrier C1. Carrier C1 may not be fixed, sun gear S1 may be fixed, and the planet gears may revolve about sun gear S1, causing carrier C1 to rotate about sun gear S1. Clutch 26 may be engaged, thereby mechanically connecting carriers C1, C2 together. As such, carrier C1 may cause carrier C2 to rotate, i.e., rotate about sun gear S2, which may be substantially prohibited from rotating via brake 22.

Gear train 10 may also receive input power from an electrical storage system 42 via motor/generator 32 and ring gear R2. Electrical storage system 42 may include, for example, an electrical circuit, a controller, a battery, a capacitor, and/or other components known in the art. Using energy from electrical storage system 42, motor/generator 32 may operate as a motor and drive ring gear R2 or operate as generator for regeneration purpose to replenish energy storage system. As is known in the art, the individual planet gears rotatably connected to carrier C2 may freely rotate about their individual axes with respect to carrier C2. Carrier C2 may not be fixed, sun gear S2 may be fixed, and the planet gears may revolve about sun gear S2, causing carrier C2 to rotate about sun gear S2.

The mechanical power transferred from power source 16 to carrier C2 via ring gear R1, carrier C1, clutch 26 may be combined with the power transmitted from motor/generator 32 to ring gear R2. Carrier C2 may transfer the combined mechanical power to final drive 18. Thus, in the "parallel" mode, power source 16 may transmit power through planetary gear set 12 and planetary gear set 14 to final drive 18, and motor/generator 32 may transmit power through planetary gear set 14 to final drive 18. Motor/Generator 32 can be operated as regeneration brake unit for vehicle slowing-down purpose.

Figure 4:
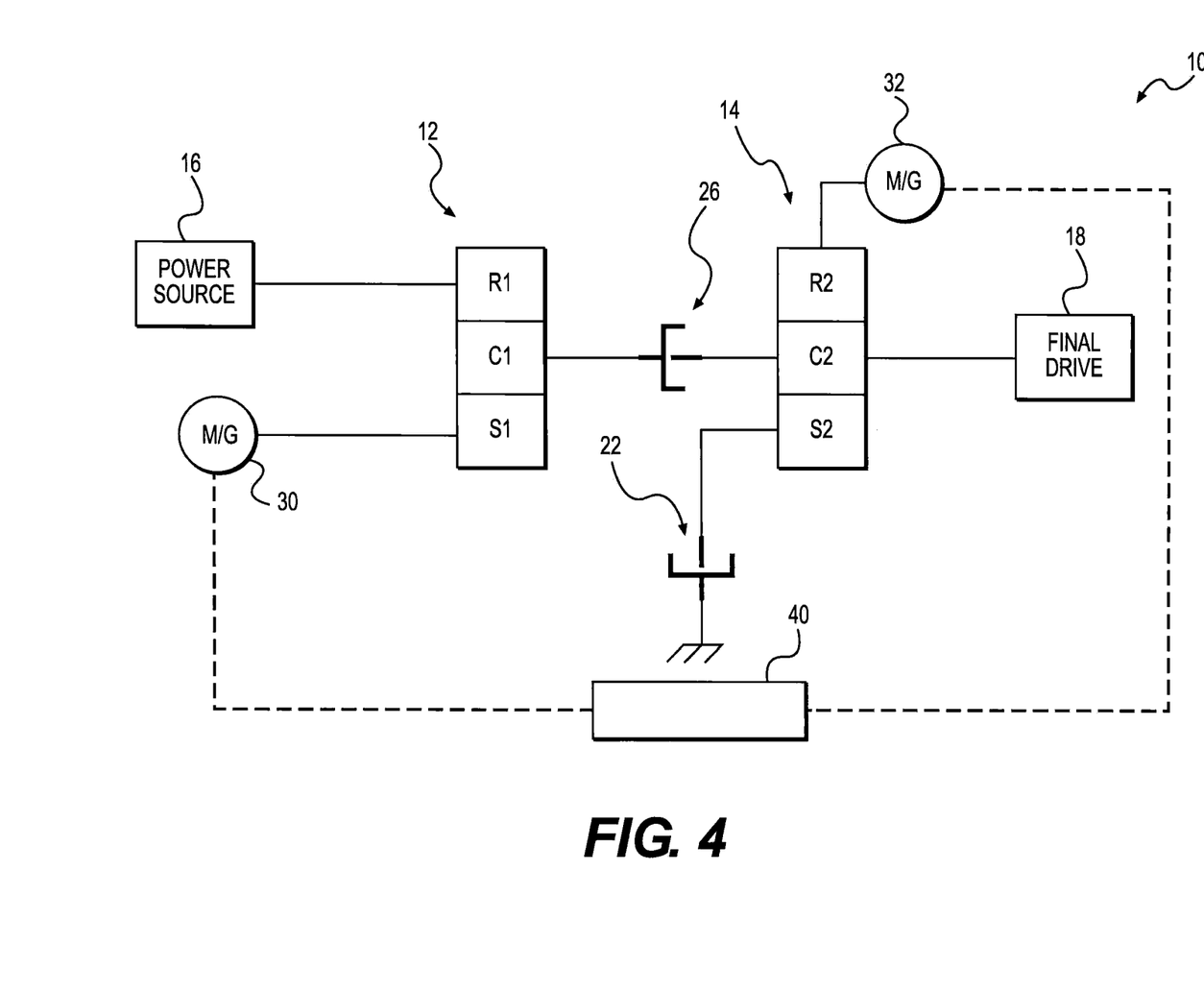
FIG. 4 is a schematic illustration of the gear train of FIG. 1 in an exemplary third operating mode.

FIG. 4. illustrates a third operating mode of power system 11 and gear train 10, in which brake 22 and clutch 26 may be engaged. This operating mode may be considered an "input CVT" operating mode wherein planetary gear set 12 may be mechanically and electrically connected to planetary gear set 14. Specifically, planetary gear sets 12, 14 may be mechanically connected via carriers C1, C2 and may be electrically connected via motor/generators 30, 32. Brake 24 and clutch 28 may be disengaged and, for clarification purposes, are not illustrated. In the "input CVT" operating mode, gear train 10 may receive input power from power source 16 via ring gear R1 causing ring gear R1 to rotate. As is known in the art, rotation of ring gear R1 may cause the planet gears connected to carrier C1 to rotate about their respective axes and revolve about sun gear S1. In turn, carrier C1 may also rotate about sun gear S1, and sun gear S1 may also rotate about its axis. Thus, carrier C1 and sun gear S1 may both rotate due to the rotation of ring gear R1.

As in the "parallel" operating mode, carriers C1 and C2 may be connected to one another via the engagement of clutch 26. As described above, carrier C1 may cause carrier C2 to rotate about sun gear S2. As in the "series" operating mode, motor/generator 30 may receive mechanical power from sun gear S1, circuit 40 may transfer electrical power from motor/generator 30 to motor/generator 32, and motor/generator 32 may input mechanical power to ring gear R2. Ring gear R2 may cause carrier C2 to rotate about sun gear S2, which is substantially prohibited from rotating via the engagement of brake 22.

The mechanical power transferred to carrier C2 from ring gears R1, R2 may be combined. Carrier C2 may transfer the combined mechanical power to final drive 18. It is contemplated that the mechanical power received from power source 16 may be varied and the mechanical power received from motor/generator 32 may be controlled to be substantially constant. Additionally, motor/generator 30 may be operated to control the speed of sun gear S1 and, thereby, control the drive ratio of planetary gear set 12. Thus, the input-output ratio from power source 16 to final drive 18 may be continuously varied.

Figure 5:
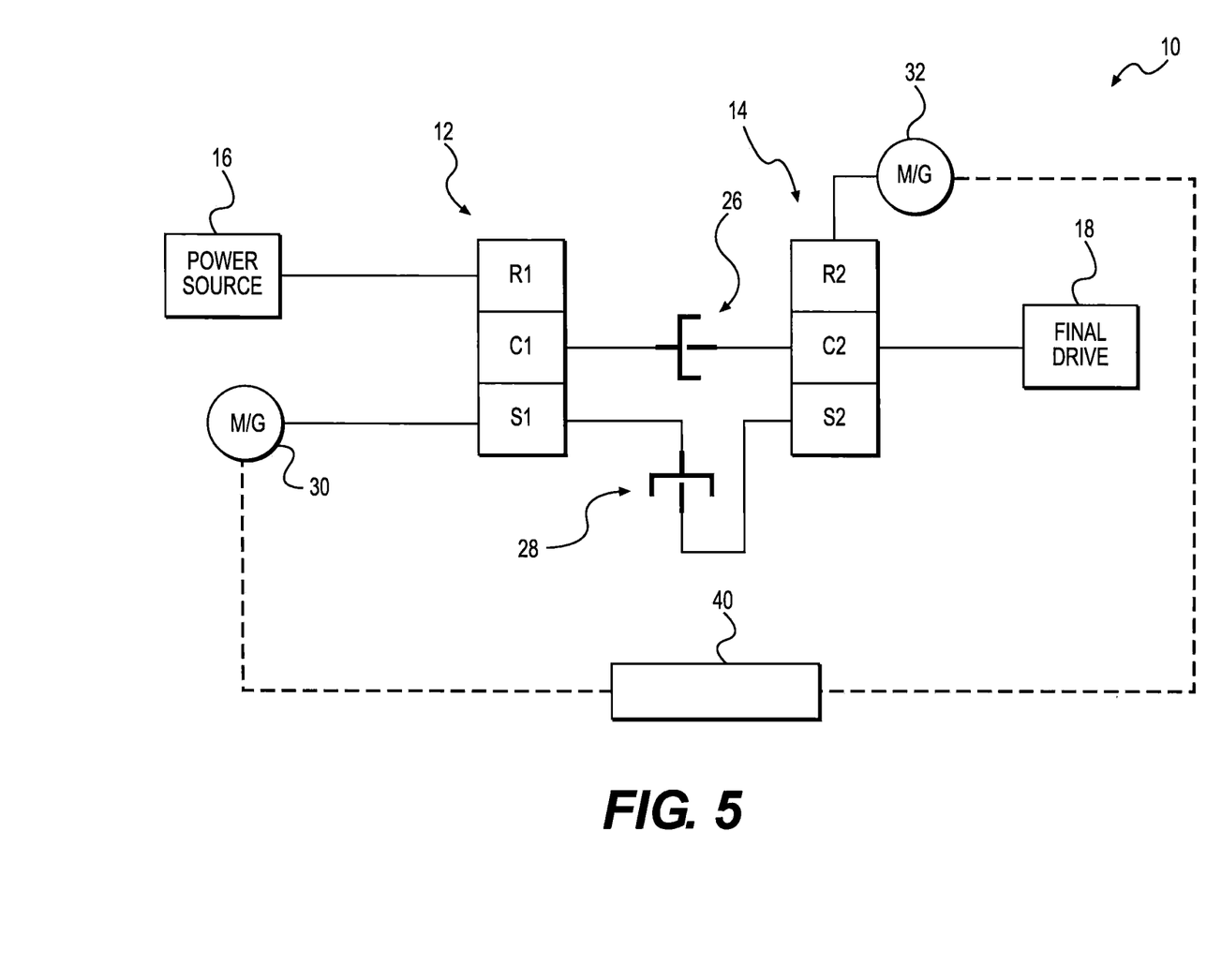
FIG. 5 is a schematic illustration of the gear train of FIG. 1 in an exemplary fourth operating mode.

FIG. 5 illustrates a fourth exemplary operating mode of power system 11 and gear train 10, in which clutches 26, 28 may be engaged. The fourth operating mode may be considered a "compound CVT" operating mode wherein planetary gear set 12 may be mechanically and electrically connected to planetary gear set 14. Specifically, planetary gear sets 12, 14 may be mechanically connected via carriers C1, and C2 and sun gears S1, S2. Planetary gear sets 12, 14 may be electrically connected via motor/generators 30, 32. Brakes 22, 24 may be disengaged and, for clarification purposes, are not illustrated. In the "compound CVT" operating mode, gear train 10 may receive input power from power source 16 via ring gear R1 causing ring gear R1 to rotate. As in the "input CVT" operating mode, rotation of ring gear R1 may cause carrier C1 and sun gear S1 to rotate. Clutch 26 may be engaged, mechanically connecting carriers C1, C2 together. As such, carrier C1 may cause carrier C2 to rotate. Additionally, motor/generator 30 may receive mechanical power from sun gear S1, circuit 40 may transfer electrical power from motor/generator 30 to motor/generator 32, and motor/generator 32 may input mechanical power to ring gear R2. Clutch 28 may be engaged, mechanically connecting sun gears S1, S2 together. As such, sun gear S1 may cause sun gear S2 to rotate. Planetary gear set 14 may be configured to receive rotational inputs via ring gear R2, carrier C2, and sun gear S2. As is known in the art, the rotational inputs of planetary gear set 14 may be combined and output, via carrier C2, to final drive 18.

It is contemplated that either one of motor/generators 30, 32 may be operated in either a driving mode, i.e., a mechanical power delivering mode, or a driven mode, i.e., a mechanical power receiving mode. As such, motor/generator 30 may be operated to transfer electrical power to motor/generator 32 via circuit 40, as described above. Alternatively, motor/generator 32 may be operated to receive mechanical power from ring gear R2 and transfer electrical power to motor/generator 30.

In addition to the four exemplary operating modes of power system 11 and gear train 10 described above with reference to FIGS. 2-5, Table 1 shows additional operating modes in which gear train 10 may be configured to operate. Although not described in detail for clarification purposes, it is contemplated that by selectively engaging various combinations of brakes 22, 24 and clutches 26, 28, gear train 10 may be operated in the operational modes provided in Table 1. Specifically, Table 1 indicates which of brakes 22, 24, if any, and which of clutches 26, 28, if any, are to be engaged for various other potential operating modes. Table 1 indicates the operational mode of each of motor/generators 30, 32 for these other possible operating modes of power system 11 and gear train 10. The additional operating modes of power system 11 and gear train 10 may include, for example, a parking/idling/neutral modes, starting modes, electrical drive modes, and reverse modes.

Figure 6:
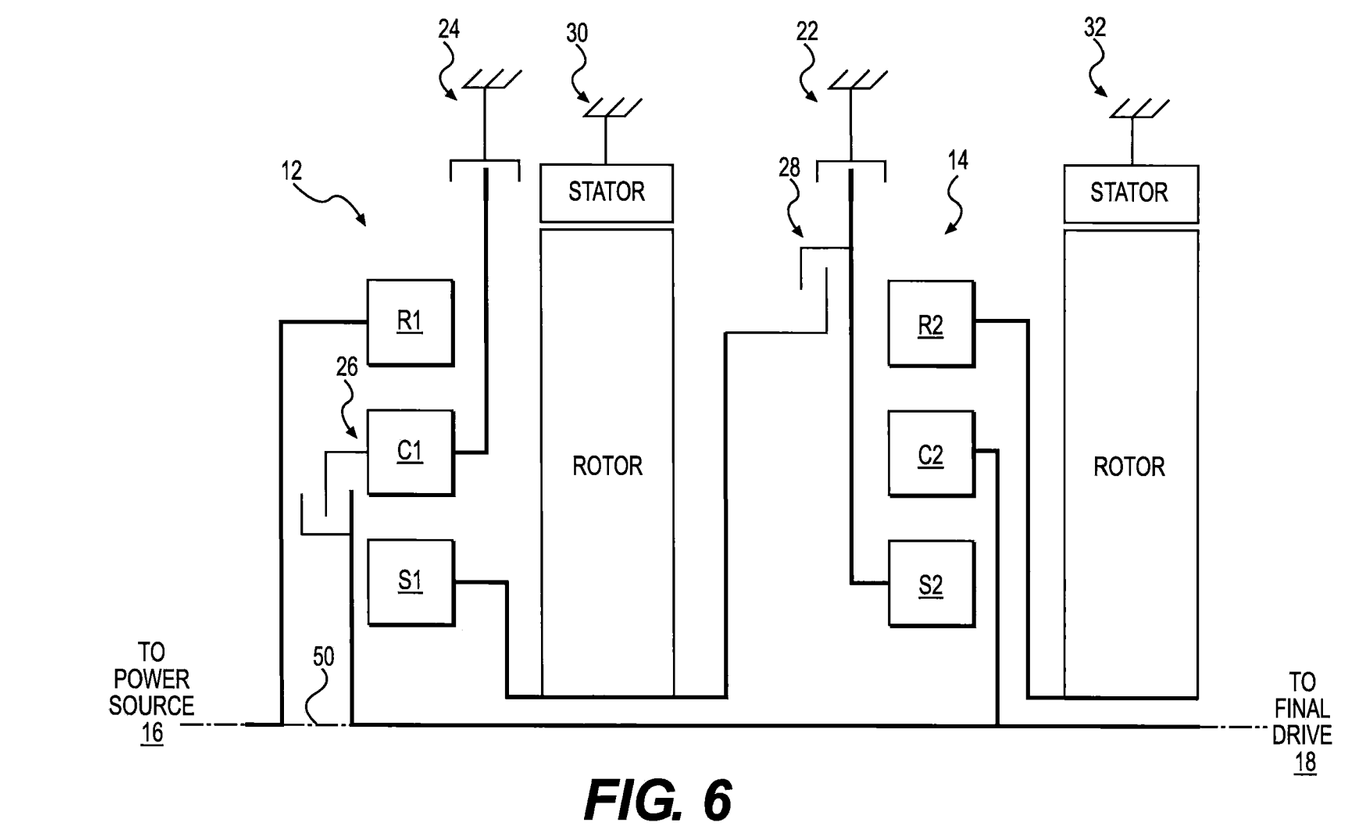
FIG. 6 is a schematic illustration of an exemplary arrangement of the gear train of FIG. 1.

FIG. 6 illustrates an exemplary arrangement of gear train 10. Specifically, gear train 10 may be arranged about a centerline axis 50 with respective shafts of sun gears S1, S2, carriers C1, C2, ring gears R1, R2, and motor/generators 30, 32 (shown with bold lines in FIG. 6) being substantially coaxial with centerline axis 50. Gear train 10 may be arranged within a housing (not shown) such that planetary gear sets 12, 14 and motor/generators 30, 32 are arranged substantially coaxially with centerline axis 50. Additionally, brakes 22, 24 and clutches 26, 28 may each be arranged substantially coaxially with centerline axis 50. It is contemplated that the arrangement shown in FIG. 6 may provide compact packaging of gear train 10 and the components thereof within a housing. It is also contemplated that although motor/generators 30, 32 are shown as electrical motor/generators having a rotor and a stator, the arrangement shown in FIG. 6 may be equally suitable for a hydraulic or pneumatic motor/generators.

INDUSTRIAL APPLICABILITY

The disclosed system may be applicable as a universal gear train and may be configured to selectively provide a parallel transmission, a series transmission, and a continuously variable transmission. Gear train 10 may receive input power from power source 16 connected to ring gear R1 of planetary gear set 12. Gear train 10 may output power to final drive 18 connected to carrier C2 of planetary gear set 14. The input-output ratio between power source 16 and final drive 18, and thus gear train 10, may be varied or fixed depending upon which of brakes 22, 24, are engaged, which of clutches 26, 28 are engaged, and the operational mode of motor/generators 30, 32.

Depending upon the operational mode of power system 11 and gear train 10, the power input received from power source 16 may or may not be varied. As such, power source 16 may be operated at one or more desired operating points, e.g., maximum power or maximum fuel economy, while additional power is supplied to final drive 18 via one or both of motor/generators 30, 32. Additionally, in some operating modes of power system 11 and gear train 10, e.g., electric drive only and/or starting modes, gear train 10 may not receive any power from power source 16. Furthermore, in some operating modes of power system 11 and gear train 10, the input-output power ratio between power source 16 and final drive 18 may be continuously varied.

It will be apparent to those skilled in the art that various modifications and variations can be made to the disclosed system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A gear train, comprising:
a first planetary gear set including a first sun gear, a first ring gear, and a first carrier;
a second planetary gear set including a second sun gear, a second ring gear, and second carrier;
a first clutch configured to selectively connect the first carrier with the second carrier;
a second clutch configured to selectively connect the first sun gear with the second sun gear;
a first brake configured to selectively fix the second sun gear; and
a second brake configured to selectively fix the first carrier, wherein a power source is continuously connected to the first ring gear.

2. The gear train of claim 1, wherein a motor/generator is continuously connected to the first sun gear.

3. The gear train of claim 1, wherein a motor/generator is continuously connected to the second ring gear.

4. The gear train of claim 1, wherein:
a first motor/generator is continuously connected to the first sun gear; and
a second motor/generator is continuously connected to the second ring gear; and
the first and second motor/generators are electrically connected to one another.

5. A method of operating a power system, comprising:
transmitting power between a power source, a first motor/generator, and a power load via a gear train that includes a first planetary gear set and a second planetary gear set, wherein:
the first planetary gear set includes a first sun gear, a first ring gear, and a first carrier,
the second planetary gear set includes a second sun gear, a second ring gear, and a second carrier, and
the power source is continuously connected to the first ring gear;
controlling transmission of power within the gear train by controlling a first clutch, a second clutch, a first brake, and a second brake, including
selectively engaging the first clutch to connect the first carrier with the second carrier,
selectively engaging the second clutch to connect the first sun gear with the second sun gear,
selectively engaging the first brake to fix the second sun gear, and
selectively engaging the second brake to fix the first carrier.

6. The method of claim 5, wherein:
the first motor/generator is continuously connected to the second ring gear.

7. The method of claim 6, wherein transmitting power between the power source, the first motor/generator, and the power load via the gear train includes selectively operating in a parallel mode, including
engaging the first clutch to connect the first and second carriers,
engaging the second clutch to connect the first and second sun gears,
engaging the first brake to fix the first and second sun gears,
transmitting power from the power source, through the first planetary gear set and the second planetary gear set, to the power load, and
transmitting power from the first motor/generator, through the second planetary gear set, to the power load.

8. The method of claim 6, wherein the power system further includes a second motor/generator continuously connected to the first sun gear.

9. The method of claim 8, wherein transmitting power between the power source, the first motor/generator, and the power load via the gear train includes selectively operating in a series mode, including
engaging the first brake to fix the second sun gear,
engaging the second brake to fix the first carrier,
transmitting power from the power source, through the first planetary gear set to the second motor/generator, and
transmitting power from the first motor/generator, through the second planetary gear set, to the power load.

10. The method of claim 8, wherein transmitting power between the power source, the first motor/generator, and the power load via the gear train includes selectively operating in a continuously variable transmission mode, including
engaging the first clutch to connect the first carrier to the second carrier,
transmitting power from the power source, through the first and second planetary gear sets, to the power load, and
controlling an operating speed of the first sun gear with the second motor/generator to control a drive ratio of the first planetary gear set.

11. The method of claim 5, wherein selectively engaging the second clutch and selectively engaging the first brake include selectively engaging the second clutch and the first brake simultaneously to connect the first and second sun gears to one another and fix both the first and second sun gears with the first brake.

12. The method of claim 5, wherein the power system is a propulsion system or implementation system for a mobile machine, and the power load is a final drive or mechanical movable linkage of the mobile machine.

13. A gear train, comprising:
a first planetary gear set and a second planetary gear set, each including a sun gear, a carrier, and a ring gear;
a plurality of clutches, each configured to selectively connect and disconnect a component of the first planetary gear set to or from a component of the second planetary gear set;
a plurality of brakes, each configured to selectively fix at least one component of one of the first and second planetary gear sets;
wherein by selectively engaging one or more of the plurality of clutches and plurality of brakes, a plurality of operating modes are enabled, including:
a first mode, wherein the first and second planetary gear sets are mechanically disconnected from one another and power is transmitted between the first and second planetary gear sets via an electrical connection between the first and second planetary gear sets, wherein the first mode includes engaging a first brake to fix the carrier of the first planetary gear set and engaging a second brake to fix the sun gear of the second planetary gear set,
a second mode, wherein power is transmitted only mechanically between the first and second planetary gear sets through one or more of the plurality of clutches, and a third mode and fourth mode, wherein power is transmitted mechanically between the first and second planetary gear sets through one or more of the plurality of clutches, and wherein and power is also transmitted between the first and second planetary gear sets via the electrical connection between the first and second planetary gear sets.

14. The gear train of claim 13, wherein in the first mode, the electrical connection between the first and second planetary gear sets includes a first motor/generator connected to the sun gear of the first planetary gear set, a second motor/generator connected to the ring gear of the second planetary gear set, and an electrical circuit connected between the first and second motor/generators.

15. The gear train of claim 13, wherein the second mode includes:
engaging a brake to fix the sun gear of the second planetary gear set;
engaging a first clutch to connect the sun gear of the second planetary gear set to the sun gear of the first planetary gear set, thereby fixing the sun gear of the first planetary gear set; and
selectively engaging a second clutch to connect the carrier of the first planetary gear set to the carrier of the second planetary gear set.

16. The gear train of claim 15, wherein in the second mode a motor/generator receives electrical power from an electrical storage system and delivers mechanical power to the ring gear of the second planetary gear set.

17. The gear train of claim 13, wherein the third mode includes:
engaging a first brake to fix the sun gear of the second planetary gear set;
engaging a first clutch to connect the carrier of the first planetary gear set to the carrier of the second planetary gear set.

18. The gear train of claim 17, wherein the third mode further includes electrically connecting the first and second planetary gear sets via a first motor/generator connected to the sun gear of the first planetary gear set, a second motor/generator connected to the ring gear of the second planetary gear set, and an electrical circuit connected between the first and second motor/generators.

19. The gear train of claim 13, wherein the fourth mode includes:
engaging a first clutch to connect the carrier of the first planetary gear set with the carrier of the second planetary gear set;
engaging a second clutch to connect the sun gear of the first planetary gear set with the sun gear of the second planetary gear set; and
electrically connecting the first and second planetary gear sets via a first motor/generator connected to the sun gear of the first planetary gear set, a second motor/generator connected to the ring gear of the second planetary gear set, and an electrical circuit connected between the first and second motor/generators.

* * * * *